July 26, 1960
R. E. DOEDEN
2,946,315
ANGLE DRIVE ATTACHMENT FOR AIR OPERATED HAND TOOL
Filed Feb. 28, 1957
2 Sheets-Sheet 1
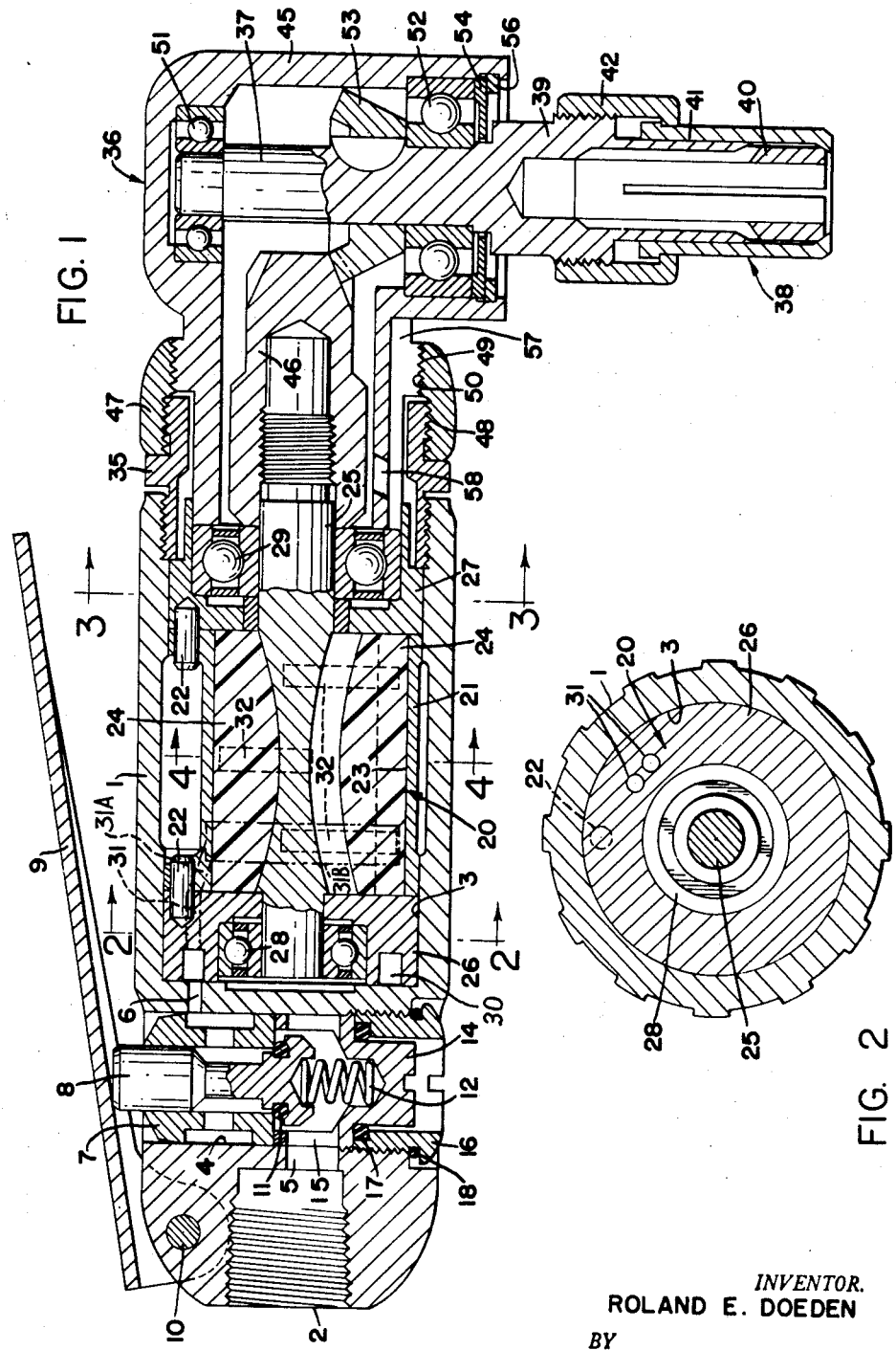
INVENTOR.
ROLAND E. DOEDEN
BY
Oberlin & Limbach
ATTORNEYS July 26, 1960
R. E. DOEDEN
2,946,315
ANGLE DRIVE ATTACHMENT FOR AIR OPERATED HAND TOOL
Filed Feb. 28, 1957
2 Sheets-Sheet 2
FIG. 3
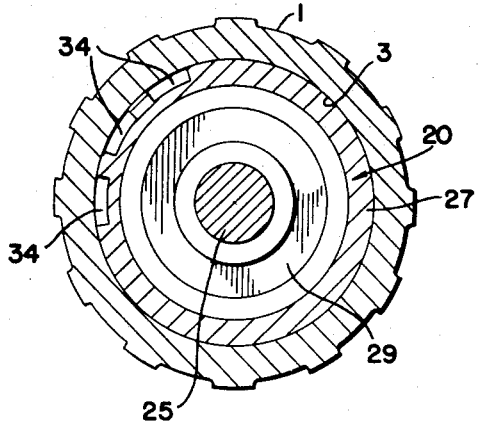
FIG. 4
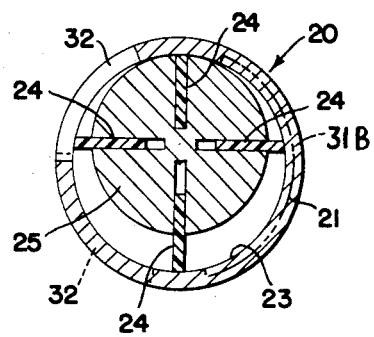
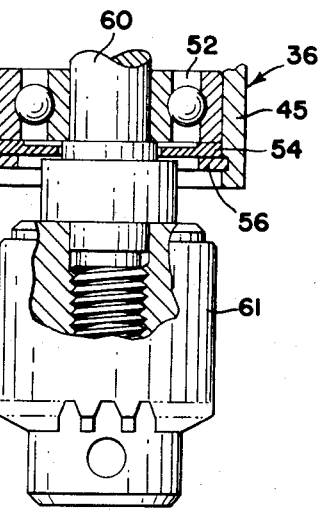
FIG. 5
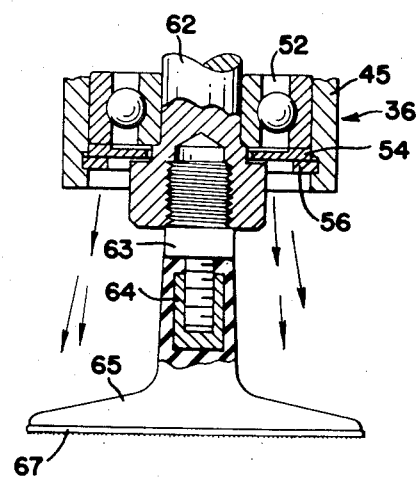
FIG. 6
INVENTOR.
ROLAND E. DOEDEN
BY
*Oberlin + Limbach*
ATTORNEYS United States Patent Office 2,946,315
Patented July 26, 1960

2,946,315
ANGLE DRIVE ATTACHMENT FOR AIR OPERATED HAND TOOL

Roland E. Doeden, Sherwood, Ohio, assignor to Doeden Tool Corporation, Sherwood, Ohio, a corporation of Ohio Filed Feb. 28, 1957, Ser. No. 643,092

7 Claims. (Cl. 121—34)

The present invention relates generally as indicated to an angle drive attachment for an air-operated hand tool, and more particularly to a high speed rotary hand tool in which the hand-held housing contains an air motor therewithin.

As a general proposition, it is known to provide angle drive attachments for rotary hand tools, the usual connection with the tool housing comprising a shouldered nut threaded onto the tool housing with the nut shoulder engaging a shoulder on the leg of the angle drive housing to thus draw the end of the latter against the end of the tool housing. The provision of such shoulder on the angle drive housing is a knotty problem in that the nut must first be slipped onto the leg and then the shoulder must be added to the leg, usually a snap ring fitted into a peripheral groove of the leg. In order that such snap ring may be installed the leg must be machined for a length sufficient to allow the nut to be slipped back far enough to expose the groove for placing of the snap ring therein. Aside from these difficulties the radial overlap of the nut shoulder and that provided by the snap ring is so small that very high unit pressures are imposed when drawing up the nut, thereby ruling out the possibility of using lightweight aluminum alloys or the like for the nut. Likewise, when a lightweight metal is used for the angle drive housing, the fit of the hardened steel snap ring in the groove thereof quickly becomes sloppy due to wear and deformation and even may require periodic tightening of the nut during extended use of the hand tool.

Another problem encountered with existing angle drives for high speed tools is that of lubrication of the bearings and bevel gears therein, since at high speeds the lubricant is thrown off by centrifugal force.

With the foregoing in mind it is a primary object of this invention to provide novel means for detachably securing an angle-drive attachment to a hand tool that avoids the shoulder problems aforesaid.

It is another object of this invention to provide an angle drive attachment in which the gears and bearings are constantly and efficiently lubricated during use by lubricant-laden air exhausted from the air motor of the hand tool.

Still another object of this invention is to provide an angle-drive attachment arranged so that the exhaust air from the air motor blows dirt and dust away from the work area and additionally has a pronounced cooling effect on the tool thereby enhancing tool life and performance.

It is still another object of this invention to provide a hand tool and attachment of the character indicated which is small and compact so as to be conveniently held in the hand and easily manipulated.

It is still another object of this invention to provide a hand tool characterized in that the air motor therefor is a self-contained assembly which is clamped in the housing or handle of the tool.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a diametral longitudinal cross-section view of the rotary hand tool showing one form of angle-drive attachment mounted thereon, the air supply control valve being controlled by a pivotal lever which is squeezed in the hand during use of the tool;

Figs. 2, 3, and 4 are transverse cross-section views taken substantially along the lines 2—2, 3—3, and 4—4, Fig. 1, respectively; and Figs. 5 and 6 are fragmentary cross-section views of the output shaft of the angle-drive attachment modified for mounting of a so-called "Jacobs" chuck (Fig. 5) and for screw mounting of a familiar form of flanged rubber disc with an abrasive face (Fig. 6).

Referring now more specifically to the drawings, and first to the form of the invention illustrated in Figs. 1–4, the same comprises generally cylindrical housing or handle 1 formed with an air pressure inlet port 2 at one end, a cylindrical cavity 3 at the other end, a transverse bore 4 adjacent the inlet port 2, and passages 5 and 6 leading to the cross bore 4 from the inlet port 2 and from the bottom of the cavity 3, respectively.

Fitted into said cross bore 4 is a valve mechanism which comprises a tubular ported bushing 7 which is preferably press-fitted into the cross bore and which slidably mounts a valve member 8 therein, the valve member extending through said bushing 7 for actuation as by means of a lever 9 which is pivotally connected on pin 10 adjacent the rear end of the housing 1.

Said valve member 8 is formed with a packing ring groove which has opposed concentric conical walls disposed at approximately a 45° angle with respect to the axis of said valve member in which groove an O-ring 11 is mounted. As apparent, when said valve member 8 is pressed upwardly, as shown in Fig. 1, the O-ring 11 seats against the bottom inside corner of the bushing 7 to thus prevent flow of air from the inlet port into the housing cavity. When said valve member is moved downwardly by squeezing the lever 9 against the housing 1, air flow is permitted, and the lips of the valve member at the conical walls of the O-ring groove serve to protect the O-ring 11 from extrusion, since the air flow is directed around the outside of the O-ring and across the open gap formed between the aforesaid lips.

The valve member 8 is resiliently urged and held in seated position by means of a spring 12 which is compressed between said valve member 8 and a spring retainer and regulator member 14, said regulator member 14 being formed with a screw driver slot or the like so that it may be rotatably adjusted whereby the port 15 may be aligned or misaligned with the inlet passage 5. Said regulator member 14 is held in place by means of the slotted tubular plug 16 which is threaded into the lower end of the cross bore 4, there being interposed rubber or rubber-like rings 17 and 18 between the regulator 14 and plug 16 and between said plug 16 and housing 1, so as to form fluid-tight seals.

The ring 17, at the same time, serves to frictionally retain the regulator 14 in desired rotary position. It can be seen that air flow through passages 5 and 15 can be regulated to any value from zero to full flow simply by turning the regulator 14 to any position between full misalignment to full alignment of said passage 15 relative to inlet passage 5.

Referring now to the air motor, the same is a complete self-contained assembly 20 which includes a stator 21 providing an eccentrically disposed chamber 23 around which laminated plastic or like vanes 24 slide to form displacement cavities in well known manner. In this particular example of the tool, there are four vanes 24 radially slidably carried by a centrally disposed rotor 25. The stator 21 has rings or motor end plates 26 and 27 secured thereto at opposite ends as by pins 22 in which the respective anti-friction bearings 28 and 29 are mounted to support the rotor 25 for free rotation with respect to the stator assembly comprising the stator 21 and said rings or end plates 26 and 27, the vanes 24 being of axail length so that the ends thereof are in close proximity to the inner-end surfaces of said rings or end plates 26 and 27.

The outer end of the ring 26 is formed with an annular groove 30 and with passages 31 leading from the bottom of such groove 30 to passages 31A and internal slot 31B of stator 21 and thence into the chamber 23. Said annular groove 30 is of diameter such that in all rotary portions of the stator assembly 21, 26, 27, said annular groove will register with the passages 6 in the bottom of the cavity 3.

The periphery of the stator 21 is formed with exhaust passages preferably in the form of transverse slots 32, and furthermore said stator 21 and ring 27 are formed with a plurality of peripheral, axially extending slots 34 for flow of the exhausted air from the motor therethrough.

The outer end of the cavity 3 in housing 1 is internally threaded for engagement by a thimble 35 which functions (1) to clamp the air motor assembly 20 in the housing 1 to seal the stator ring 26 against the bottom of the cavity, the clamping pressure being applied through the outer race of the anti-friction bearing 29; and (2) to constitute a mounting means for the angle drive attachment 36. The output shaft 37 of the attachment 36 is equipped with a tool gripping chuck 38.

The chuck 38 aforesaid may be of any well-known form, but is illustratively shown herein as comprising a chuck body 39 into which a contractible collet 40 (alternately slotted from its opposite ends) is fitted. Frustoconical cam surfaces in the body 39 and on the collet 40 cooperate to contract the latter when forced axially endwise into the chuck body 39. The means for thus axially moving the collet 40 comprise a two-part nose piece assembly, the part 41 of which engages the outer end of the collet and the part 42 of which engages a shoulder of the part 41 and has threaded engagement with the chuck body 39.

The angle-drive attachment 36 herein comprises an angle housing 45 one leg of which is tubular and surrounds the bevel pinion 46 which is screwed onto the threaded end of the rotor shaft 25 with its inner end abutting the inner race of bearing 29. Said tubular leg is piloted in the tubular extension of motor end plate 27 and the end of said leg is adapted to be drawn up into frictional engagement with the outer race of bearing 29 by means of the nut 47 that has threaded engagement with thimble 35.

The shoulder problems aforesaid are herein entirely eliminated by forming the nut with threads 48 and 49 of opposite hand, for example, right hand threads 48 engaged with thimble 35 and left hand threads 49 engaged with thread 50 on the leg of angle housing 45. With such arrangement, the nut 47 is first screwed onto the leg of the angle housing 45, preferably all the way back, whereupon the nut 47, when turned with respect to housing 45 to engage threads 48 with thimble 35, causes the leg of the housing to be forced axially by threads 48 and 49 into frictional engagement with said bearing 29. The engagement of several threads 49 and 50 as shown constitutes the equivalent of shoulders of substantial radial width whereby unit pressures are low, thus enabling use of lightweight metal such as aluminum or aluminum alloy for both the nut 47 and housing 45.

Moreover, the angle housing 45 is solidly and accurately supported by relatively widely spaced apart points (within motor end plate 27 and at threads 50).

The output shaft 37 of attachment 36 is journalled in the other leg of housing 45 as by means of ball bearings 51 and 52 and has keyed thereon a bevel gear 53 which meshes with bevel pinion 46. A bearing shield 54 is held in place by snap ring 56.

A characterizing feature of the present invention is that when a lubricator is installed in the air pressure supply line, the lubricant-laden air not only lubricates the air motor 20 but, additionally, the exhaust air flows through slot 57 and is directed generally toward the work area; through opening 58 and along bevel pinion 46 to the point of gear intermesh to lubricate the teeth; through bearing 52 to lubricate the latter; and through the space between shaft 37 and shield 54 along chuck 38 toward the work area. Such lubricant laden air also reaches bearing 51 since a back pressure is built up within housing 45. Lubricant laden air also passes to some degree through bearing 29 by slight leakage through the inside of the motor end plate 27.

In the use of this tool, an air supply hose with a lubricator therein is connected to the inlet port 2 of the housing 1 and the desired tool, such as a small, pointed grinding element, for example, is mounted in the chuck 38. The housing 1 is then grasped in one hand and operation is started by squeezing the lever 9 toward the housing 1, thus permitting air flow into the air motor in a manner already described.

In a tool which is on the order of 4½" to 4¾" in length and with a housing 1 of approximately 1¼" diameter and an air pressure supply of 90 p.s.i., the rotor 25 has a free running speed of 30,000 r.p.m. and a working speed, under load, of about 15 to 20,000 r.p.m.

The embodiment of the invention shown in Fig. 5 is essentially the same as that shown in Figs. 1 to 4, except that the output shaft 60 has been modified for mounting of the well-known Jacobs chuck 61 thereon.

With reference to Fig. 6, the output shaft 62 has been modified for threading of an adaptor 63 thereinto, said adaptor having a threaded lower end thereon for screwing into the insert 64 molded in the shank of a rubber disc 65, the outside face of said disc having an abrasive disc 67 cemented thereto. By reason of the exhaust air flow as shown by the arrows toward said disc 65 it has been found that the life thereof has been materially increased. Also, when the adhesive for disc 67 is of the pressure sensitive type the lower temperature operation of disc 65 prevents softening of the adhesive and resultant sliding of the abrasive disc 67. Obviously, the adaptor 63 may be provided with a plain upper end portion for use as with the chucks shown in Figs. 1 and 5.

Other modes of applying the principle of the invention may be employed, change being made as regards the details described, provided the features stated in any of the following claims, or the equivalent of such, be employed.

I claim:

1. An angle drive assembly comprising a power device having a bevel drive pinion; an angle drive attachment including a rotary tool mounting shaft having a bevel gear thereon adapted to mesh with said pinion; and means for detachably securing said attachment and device together in any desired relative rotary position; said means comprising a nut formed with threads of opposite hand engaged with threads on said device and attachment respectively and operative upon turning of said nut in one direction relative to said attachment and said device to draw the same together into frictional engagement.

2. The angle drive assembly of claim 1 wherein said device and attachment are formed with right hand and left hand threads respectively.

3. The angle drive assembly of claim 1 wherein said attachment is provided with a tubular leg surrounding said pinion and wherein said device is provided with a tubular portion constituting a pilot for said leg.

4. An angle drive attachment comprising a hollow, angular housing formed with tubular legs, a shaft with tool mounting means extending coaxially into one leg and journalled therein, a bevel gear keyed on said shaft adapted to mesh with a bevel drive pinion extending coaxially into the other leg, said other leg being formed with an end portion of circular section adapted to have piloted engagement with a power device for driving such pinion, said other leg further being formed with left hand threads axially removed from such end portion, and a nut on such threads adapted to engage right hand threads on such power device by means of which such end portion is adapted to be urged into frictional engagement with such power device.

5. An air-operated hand tool comprising an elongated housing adapted for holding in the hand and formed with an air inlet port at one end adapted for connection with a supply of lubricant-laden air under pressure, said housing containing an exhaust at such other end and a rotary air motor assembly within said housing driven and lubricated by said lubricant-laden air; a thimble screwed into said housing to clamp said motor assembly therein; an angle drive housing having angularly related tubular legs, one leg of which is threaded; a nut threaded on said one leg and on opposite hand threads of said thimble whereby, upon rotation of said nut in one direction relative to said elongated and angle-drive housings, the latter is drawn up into frictional engagement with said motor assembly; an output shaft journalled in the other leg of said angle-drive housing and having means for mounting of a tool thereon; and meshing bevel gears in said angle-drive housing and mounted on said drive shaft and output shaft respectively; said one leg of said angle-drive housing and said thimble forming an exhaust passage which leads from said motor assembly exhaust through said angle-drive housing to lubricate said gears and out to discharge the air generally axially of said output shaft and toward the work area of the tool adapted to be mounted on said output shaft.

6. The air-operated hand tool of claim 5 wherein said one leg of said angle-drive housing is formed with an opening through the wall thereof to permit air flow generally axially along said drive shaft and gear thereon to the area of the meshing teeth of said gears.

7. The air-operated hand tool of claim 5 wherein said one leg is formed with a slot through which some of the exhaust air flows against the side of said other leg and thence generally axially of said other leg toward the work area.

References Cited in the file of this patent
UNITED STATES PATENTS

| | | |
|---|---|---|
| 581,050 | Wentz | Apr. 20, 1897 |
| 2,155,082 | Decker | Apr. 18, 1939 |
| 2,384,399 | Reynolds | Sept. 4, 1945 |
| 2,570,164 | Shaff | Oct. 2, 1951 |
| 2,575,640 | Shaff | Nov. 20, 1951 |
| 2,604,795 | Ristow | July 29, 1952 |
| 2,698,604 | Edwards | Jan. 4, 1955 |
| 2,715,889 | Sturrock | Aug. 23, 1955 |
| 2,763,060 | Swanson | Sept. 18, 1956 |
| 2,780,966 | Frost et al. | Feb. 12, 1957 |
| 2,830,560 | Doeden | Apr. 15, 1958 |